UNITED STATES PATENT OFFICE.

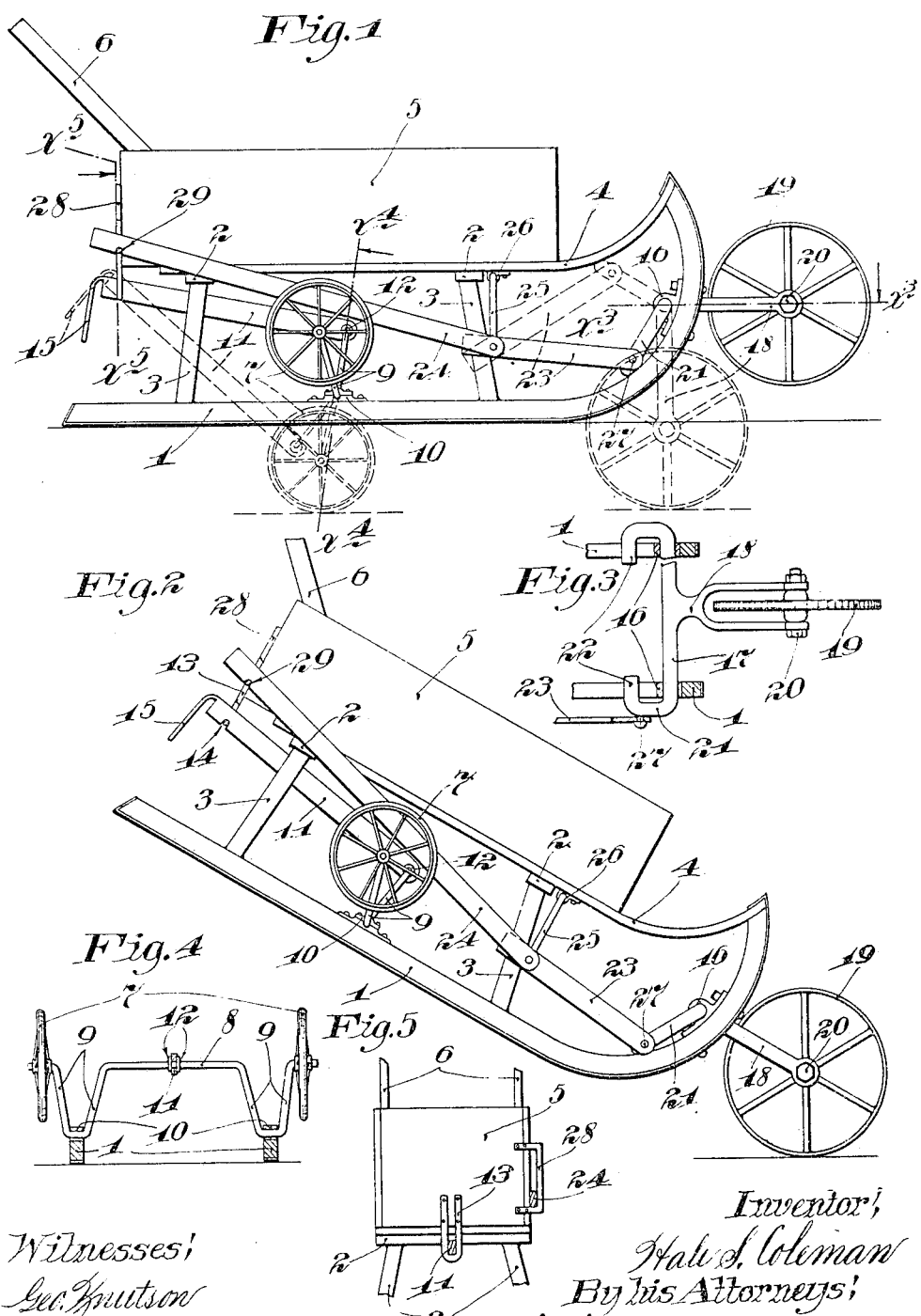

HALE SYLVESTER COLEMAN, OF ASHLAND, WISCONSIN, ASSIGNOR OF ONE-HALF TO VERNON P. COLEMAN, OF CHAMPLIN, MINNESOTA.

CONVERTIBLE SLED AND CARRIAGE.

1,117,638.  Specification of Letters Patent.  Patented Nov. 17, 1914.

Application filed December 21, 1912. Serial No. 737,953.

*To all whom it may concern:*

Be it known that I, HALE SYLVESTER COLEMAN, a citizen of the United States, residing at Ashland, in the county of Ashland and State of Wisconsin, have invented certain new and useful Improvements in Convertible Sleds and Carriages; and I do hereby declare the following to be a full, clear, and exact description of the invention, such as will enable others skilled in the art to which it appertains to make and use the same.

My invention relates to improvements in children's convertible sleds and carriages, and has for one of its objects to provide the same with front and rear wheels that may be independently raised or lowered, at will, into planes above or below the road engaging surfaces of the runners of the sled. By lowering either or both sets of wheels, the runners of the sled are caused to be raised above the road when a portion of the sidewalk or road is engaged where the snow has been removed, thus carrying the sled across the bare spot on wheels.

Another object of my invention is to so locate the front wheel of the vehicle that, when raised, it may be brought into contact with the road by simply lifting the rear end of the sled, thereby permitting the vehicle to be moved in the manner of a wheel barrow in crossing the bare spot.

To the above ends, generally stated, the invention consists of the novel devices and combinations of devices hereinafter described and defined in the claims.

The invention is illustrated in the accompanying drawings, wherein like characters indicate like parts throughout the several views.

Referring to the drawings: Figure 1 is a side elevation of the vehicle as the same will appear when used as a sled and, by means of dotted lines, the wheels are shown in different positions to support the sled above the road; Fig. 2 is a side elevation of the vehicle as the same will appear when used as a wheel barrow; Fig. 3 is a view partly in plan and partly in horizontal section taken on the line $x^3$ $x^3$ of Fig. 1, some parts being broken away; Fig. 4 is a detail view partly in rear end elevation and partly in vertical section, taken on the line $x^4$ $x^4$ of Fig. 1; and Fig. 5 is a detail view partly in rear end elevation and partly in vertical section, taken on the line $x^5$ $x^5$ of Fig. 1.

Of the parts of the sled, which may be of the ordinary or any desired construction, the numeral 1 indicates the runners, the numeral 2 the cross bars, connected to and supported above the runners by front and rear knees 3, and the numeral 4 indicates the raves supported on the cross bars 2 and the upper ends of the curved front portions of the runners 1. To the raves 4 is secured the box or vehicle body 5, equipped with a pair of connected upwardly and rearwardly projecting push bars 6.

A pair of truck wheels 7 is journaled on the ends of an oscillatory crank axle 8, having a pair of alined cranks 9, journaled in bearings 10 secured to the upper surface of the runners 1, intermediately between the two knees 3. As best shown in Figs. 1 and 2, the ends of the crank axle 8 are out of axial alinement with the intermediate portion thereof, so as to bring the wheels 7, when raised, and the intermediate portion of the crank axle 8 on different sides of a dead center, the purpose of which will presently appear.

For locking the wheels 7 in raised or lowered positions above or below the runners 1, respectively, the forward end of an operating bar 11 is loosely journaled to the intermediate portion of the crank axle 8 between a pair of spacing collars 12, rigidly secured to said crank axle 8. The rear end portion of the operating bar 11 is loosely mounted for endwise sliding movement in a keeper bracket 13, secured to and depending from the rear end portion of the box 5. In the under edge portion of the operating bar 11 is cut a single lock notch 14, having interlocking engagement with the lower transverse portion of the keeper bracket 13, when the wheels 7 are in either their raised or lowered positions. At its extreme outer end, the operating bar 11 terminates in a downturned hook extension 15, by which the operating bar 11 may be lifted, by the hand or foot, a distance sufficient to bring its lock notch 14 out of engagement with the keeper bracket 13. Obviously, upon lifting the lock notch 14 out of engagement with the keeper bracket 13, the wheels 7, under the action of gravity, will drop from their raised to their lowered positions, as indicated by dotted lines in Fig. 1. During this movement of the wheels 7, the operating bar 11 will first slide outward and then inward through the keeper bracket 13 until the lock notch 14 again engages the keeper bracket 13, thereby locking the wheels in their lowered positions.

Bearing brackets 16, in which is journaled a rock shaft, are secured, one to each of the inner faces of the curved forward ends of the runners 1. Integrally formed with the intermediate portion of the rock shaft 17 is a laterally projecting bifurcated head 18, the prongs of which project forward from the runners 1 and embrace a wheel 19 of a diameter considerably larger than that of the wheels 7. This wheel 19 is journaled to the ends of the prongs of the head 18, by a nut-equipped bolt 20. The ends of the rock shaft 17, outward of the bearings 16, are first bent laterally to afford crank arms 21 and are then bent upon themselves to afford a pair of stop lugs 22, arranged to engage either the runners 1 or raves 4, to limit the rocking movement of the shaft 17. To lock the wheel 19 in either a raised or lowered position, as indicated by full and dotted lines in Fig. 1, a two-part operating bar is located at one side of the sled. The operating bar comprises a short section 23 and a long section 24, pivotally connected, at their overlapped end, by a swing hanger rod 25, suspended from a bearing 26, secured to the under side of the overlying rave 4. The outer end of the operating bar section 23 is pivotally secured at 27 to the outer end of one of the crank arms 21, while the outer end of the operating bar section 24 works endwise through a keeper bracket 28, secured to the rear end and projecting to one side of the box 5.

A lock notch 29 is cut in the under edge of the outer end portion of the operating bar section 24, and has interlocking engagement with the lower transverse portion of the keeper bracket 28 when the wheel 19 is in either its raised or lowered position.

To change the wheel 19 from its full line position to its dotted line position, in Fig. 1, it is only necessary to lift the projecting end of the operating bar section 24 a distance sufficient to carry its lock notch 29 out of engagement with the keeper bracket 28. When the operating bar section 24 is released, the wheel 19 will drop, under the action of gravity, from its full line to its dotted line position, as shown in Fig. 1. During the downward movement of the wheel 19, the operating bar sections 23 and 24 are first moved rearward and then forward through the keeper bracket 28, until the lock notch 29 again engages the keeper bracket 28 and thereby locks the wheel 19 in its lower position. By the engagement of the stop lugs 22 with the runners 1 and raves 4, when the wheel 19 is in either its raised or lowered position, the operating bar sections 23 and 24 are relieved of all strain that would otherwise come thereon.

When the vehicle is used as a sled, the wheels 7 and 19 are supported above the road a sufficient distance to prevent the accumulation of snow or slush thereon. If a bare spot on the sidewalk or road is encountered, the wheels 7 may be lowered in a manner previously described, and the sled carried over said bare spot on the wheel 7 or, if desired, the wheel 19 may also be lowered, for coöperation with the wheel 7. Or the wheels 7 and 19 may be left in their raised positions indicated by full lines in Fig. 1 and the rear end of the sled elevated a sufficient distance to bring the wheel 19 into contact with the road and thereby lift the sled entirely off from the road and permit the vehicle to be used as a wheel barrow. To reset the wheels 7 and 19 from their dotted line to their full line positions shown in Fig. 1, the operating bar 11 and the operating bar 24 are first drawn rearward and then pushed forward until their lock notches again engage the keeper brackets 13 and 28.

The above described device, while extremely simple and of comparatively small cost to manufacture and apply to either new or old sleds, is thought to be highly efficient for the purpose had in view.

What I claim is:

1. The combination with a sled, of a rock shaft journaled on said sled and having a wheel-supporting head, a wheel journaled on said head, for movement eccentric to the curved front ends of the runners of said sled, and projecting in front of the road-engaging surfaces of the runners of said sled, and means for oscillating said rock shaft to carry said wheel into and out of engagement with the road.

2. The combination with a sled having a push bar, of a rock shaft journaled on said sled and having a wheel supporting head, a wheel journaled on said head for movement eccentric to the curved front ends of the runners of said sled and projecting entirely in front of the road engaging surfaces of the runners of said sled, and means for oscillating said rock shaft to carry said wheel into and out of engagement with the road, substantially as described.

3. The combination with a sled having a push bar, of a transverse rock shaft journaled on said sled and having a crank arm and a bifurcated wheel supporting head, a wheel journaled in the prongs of said bifurcated head for movement eccentric to the curved front ends of the runners of said sled and projecting entirely in front of the road engaging surfaces of the runners of said sled, an operating bar connected to said crank arm for oscillating said rock shaft to carry said wheel into and out of engagement with the road, and means for locking said rock shaft at the limits of its extreme movements, substantially as described.

4. The combination with a sled having a push bar, of a transverse rock shaft journaled on said sled and having a crank arm and a bifurcated wheel supporting head, a wheel journaled to the prongs of said bifurcated head and projecting in front of said sled, stops for limiting the oscillatory movement of said rock shaft, a two-part operating bar having a flexible joint pivotally secured, at one end, to the crank arm of said rock shaft, and having, at its other end, a lock notch, a keeper bracket secured to said sled through which the notched end of said operating bar works, the lock notch of said operating bar having interlocking engagement with said keeper bracket at the limits of the extreme movements of said rock shaft, substantially as described.

In testimony whereof I affix my signature in presence of two witnesses.

HALE SYLVESTER COLEMAN.

Witnesses:
OSCAR TOEPEL,
WILLIS WELKER.

Copies of this patent may be obtained for five cents each, by addressing the "Commissioner of Patents, Washington, D. C."